(12) United States Patent
Koo et al.

(10) Patent No.: US 8,995,315 B2
(45) Date of Patent: Mar. 31, 2015

(54) METHOD OF CALCULATING C VALUE USED FOR UPLINK POWER CONTROL

(75) Inventors: Hyoun Hee Koo, Gwangju (KR); Sang Rok Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 940 days.

(21) Appl. No.: 11/733,719

(22) Filed: Apr. 10, 2007

(65) Prior Publication Data

US 2007/0243895 A1    Oct. 18, 2007

Related U.S. Application Data

(60) Provisional application No. 60/790,896, filed on Apr. 10, 2006.

(30) Foreign Application Priority Data

Apr. 18, 2006  (KR) .................. 10-2006-0035087
May 12, 2006  (KR) .................. 10-2006-0043048

(51) Int. Cl.
*H04B 7/00* (2006.01)
*H04W 52/28* (2009.01)
*H04W 52/14* (2009.01)
*H04W 52/24* (2009.01)

(52) U.S. Cl.
CPC .......... *H04W 52/286* (2013.01); *H04W 52/288* (2013.01); *H04W 52/146* (2013.01); *H04W 52/246* (2013.01); *Y02B 60/50* (2013.01)
USPC .......................................... 370/310; 455/522

(58) Field of Classification Search
USPC .............. 370/310, 318; 455/522, 127.1; 379/395.1; 398/94, 197
See application file for complete search history.

(56) References Cited

U.S. PATENT DOCUMENTS

| 6,856,812 | B1 | 2/2005 | Budka et al. |
| 2002/0163980 | A1 | 11/2002 | Ruohonen |
| 2003/0109274 | A1 | 6/2003 | Budka et al. |

(Continued)

FOREIGN PATENT DOCUMENTS

| CN | 1555612 | 12/2004 |
| EP | 1628413 | 2/2006 |

(Continued)

OTHER PUBLICATIONS

ETSI TS 145 008 V6.11.0 (Jan. 2005) Digital cellular telecommunications system (Phase 2+); Radio subsystem link control (3GPP TS 45.008 version 6.11.0 Release 6). http://pda.etsi.org/exchangefolder/ts_145008v061100p.pdf.*

(Continued)

*Primary Examiner* — George Eng
*Assistant Examiner* — Marcus Hammonds
(74) *Attorney, Agent, or Firm* — Lee, Hong, Degerman, Kang & Waimey

(57) ABSTRACT

A method of calculating a specified value when entering a second radio resource (RR) mode from a first RR mode is disclosed. More specifically, the method includes calculating a new specified value to be used in the second RR mode using a filter, an iteration index, and a last specified value calculated in the first RR mode if the calculation of the specified value is performed in the first RR mode, and calculating a new specified value to be used in the second RR mode by restarting the filter if the calculation of the specified value is not performed in the first RR mode.

12 Claims, 2 Drawing Sheets

(56) References Cited

U.S. PATENT DOCUMENTS

| | | | |
|---|---|---|---|
| 2003/0185159 | A1 | 10/2003 | Seo et al. |
| 2004/0097233 | A1* | 5/2004 | Pecen et al. .................. 455/437 |
| 2005/0261017 | A1* | 11/2005 | Vaittinen et al. ............. 455/522 |
| 2005/0276244 | A1* | 12/2005 | Gronberg et al. ............. 370/328 |
| 2006/0159059 | A1* | 7/2006 | Vaittinen et al. ............. 370/347 |

FOREIGN PATENT DOCUMENTS

| | | |
|---|---|---|
| KR | 2001-0090812 | 10/2001 |
| KR | 10-2005-0023193 | 3/2005 |
| WO | 02075960 | 9/2002 |

OTHER PUBLICATIONS

ESTI TS 145.008 V6.17.0 (Jun. 2006) Digital cellular telecommunications system (Phase 2+); Radio subsystem link control (3GPP TS 45.008 version 6.17.0 Release 6). http://pda.etsi.org/exchangefolder/ts_145008v061700p.pdf.*

Korean Intellectual Property Office Application Serial No. 10-2006-0043048, Notice of Allowance dated Jan. 24, 2013, 2 pages.

3rd Generation Partnership Project (3GPP), "Technical Specification Group GSM/EDGE Radio Access Network; Radio subsystem link control (Release 7)," 3GPP TS 45.008 V7.2.0, XP050379194, Jan. 2006, 111 pages.

Kurjenniemi, et al., "Handover and Uplink Power Control Performance in the 3.84 Mcps TDD mode of UTRA Network," Wireless Personal Communications vol. 27, No. 4, XP-001186012, Dec. 2003, pp. 337-351.

European Patent Office Application Serial No. 07745894.1, Search Report dated May 14, 2014, 7 pages.

* cited by examiner

METHOD OF CALCULATING C VALUE USED FOR UPLINK POWER CONTROL

Pursuant to 35 U.S.C. §120, this application claims the benefit of U.S. Provisional Application Ser. No. 60/790,896, filed on Apr. 10, 2006, and pursuant to 35 U.S.C. §119(a), this application claims the benefit of earlier filing date and right of priority to Korean Application No. P2006-35087, filed on Apr. 18, 2006, and Korean Application No. P2006-43048, filed on May 12, 2006, the contents all of which are hereby incorporated by reference herein in their entireties.

BACKGROUND OF THE INVENTION

1. Field of the Invention

The present invention relates to a method of calculating a value for power control, and more particularly, to a method of calculating C value for uplink power control.

2. Discussion of the Related Art

Global System for Mobile Communication (GSM) was developed to bring together different communication systems in Europe. Further, General Packet Radio Service (GPRS) introduced packet switched data into GSM systems. The GPRS provides packet data service which means that multiple users can share the same transmission channel, only transmitting when there is data to send. GSM can be referred to as circuit-switched data service which establishes a radio resource (RR) connection and reserves the full bandwidth of that circuit-switched data during the lifetime of the RR connection. The difference with packet data service is that the packet data service can have total available bandwidth dynamically dedicated to those users who are actually sending at any given moment, providing higher utilization where users only send or receive data intermittently.

Enhanced Data Rate for GSM Evolution (EDGE) introduced 8-phase shift keying (8-PSK) into GSM/GPRS networks. EDGE can use 8-PSK as well as Gaussian Minimum Shift Keying (GMSK) of GSM as the modulation scheme. With an exception of modulation scheme of GPRS, most of non-modulation techniques of GPRS can be applied to EDGE.

Further, EDGE includes two enhanced data rates, and they are an enhanced circuit switched data service (ECSD) and an enhanced packet switched data service which is also referred to as enhanced GPRS (EGPRS). Because implementation of ECSD is regarded as impractical in the real world, EDGE can be regarded as EGPRS.

EDGE is a superset to GPRS and can function on any network with GPRS deployed on it, provided that the operator of GSM/GPRS networks implements the necessary upgrades. Further, EDGE uses different modulation and/or coding schemes such as MCS1 to MCS9 from CS1 to CS4 used for GSM/GPRS networks so as to optimize the transmission rate.

GSM/GPRS/EDGE is based on a time division multiple access (TDMA) as an access technology. In the system, a communication between a base station subsystem (BSS) and a mobile station (MS) takes place in form of time slots. Here, transmission from the BSS to the MS is referred to as downlink transmission, and the transmission from the MS to the BSS is referred to as uplink transmission.

SUMMARY OF THE INVENTION

Accordingly, the present invention is directed to a method of calculating C value for uplink power control that substantially obviates one or more problems due to limitations and disadvantages of the related art.

An object of the present invention is to provide a method of calculating a specified value when entering a second radio resource (RR) mode from a first RR mode.

Another object of the present invention is to provide a method of calculating a specified value in a dedicated mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of calculating a specified value when entering a second radio resource (RR) mode from a first RR mode includes calculating a new specified value to be used in the second RR mode using a filter, an iteration index, and a last specified value calculated in the first RR mode if the calculation of the specified value is performed in the first RR mode, and calculating a new specified value to be used in the second RR mode by restarting the filter if the calculation of the specified value is not performed in the first RR mode.

In another aspect of the present invention, a method of calculating a specified value when entering a second radio resource (RR) mode from a first RR mode includes calculating a new specified value to be used in the second RR mode using a filter, an iteration index, and a last specified value calculated in the first RR mode if the specified value is calculated in the second RR mode, wherein the specified value is not calculated if the specified value is not calculated in the second RR mode.

In a further aspect of the present invention, a method of calculating a specified value when entering a second radio resource (RR) mode from a first RR mode includes calculating the specified value to be used in the second RR mode using a filter, an iteration index, and a last specified value calculated in the first RR mode if the specified value is calculated in the first RR mode and if a network and a mobile station support a Dual Transfer Mode (DTM) Enhancements.

Yet in another aspect of the present invention, a method of calculating a specified value in a dedicated mode includes calculating a new specified value using a filter, an iteration index, and a last specified value, wherein the filter is a running average filter, $C_n=(1-b)*C_{n-1}b*SS_n$, where b is a forgetting factor, n is the iteration index, and $SS_n$ is a received signal level.

In a further aspect of the present invention, a method of calculating a specified value in a dedicated mode includes calculating the specified value, C, using $P_{CH}$ value which is an uplink transmit power provided by a network, wherein the uplink transmit power is expressed by $P_{CH}=\min(\Gamma_0-\Gamma_{CH}-\alpha*(C+48), \text{PMAX})$ where $\Gamma_{CH}$, $\Gamma_0$, $\alpha$, and PMAX are control information necessary to determining the uplink transmit power.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the GSM/GPRS/EDGE system, there are various types of radio resource modes including idle/packet idle mode, packet transfer mode, dedicated mode, and dual transfer mode (DTM). In the GSM/GPRS/EDGE system, if the system is indicated by "GSM attached," then there are two RR modes (i.e., packet idle mode and dedicated mode). Here, GSM attached can also be interpreted as GPRS detached. That is, GSM attached can be regarded as GPRS detached if the MS supports GPRS. Moreover, if the system is indicated by "GPRS attached," then there are two RR modes (i.e., packet idle mode and packet transfer mode). Here, GPRS attached can interpreted as GSM detached. That is, GPRS attached can be regarded as GSM detached if the MS supports GSM. Further, if the MS supports DTM class A mode of operation, then an additional RR mode (i.e., DTM) can be supported. Here, DTM can be defined by GSM attached and GPRS attached.

Figure 1:
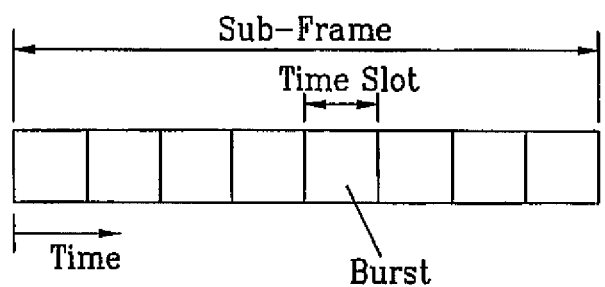
FIG. 1 is an exemplary diagram illustrating a frame structure in GPRS/EDGE.

FIG. 1 is an exemplary diagram illustrating a frame structure in GPRS/EDGE systems. Referring to FIG. 1, each frame comprises eight (8) time slots, and different types of bursts can be included in each time slot. A normal burst (NB) represents one of different types of bursts. Four (4) bursts or four (4) time slots extracted from four (4) consecutive frames can be combined to represent a radio block. For example, time slot #2 represents one time slot. The same time slot #2 from each of the four frames is received to from a radio block.

If the MS is in the dedicated mode (e.g., circuit-switched), there is only RR connection. Here, the MS output power (or uplink transmit power) is provided by the network. In other words, the network notifies how much power to use in transmitting in the uplink direction. As such, the MS simply follows the direction from the network. Hereinafter, the network can also be referred to as a base station (BS), base station subsystem (BSS), or base transceiver system (BTS). In addition, the MS can also be described as an access terminal (AT), mobile subscriber station (MSS), or terminal, among others.

If, however, the MS is in the packet transfer mode (e.g., packet-switched), the MS output power is calculated by the MS for transmitting the uplink packet data to the network. In the GPRS and/or EDGE systems, MS output power can be determined according to various schemes. One of the schemes include using control information whose received signal level, received by a mobile station (MS), is normalized.

The MS output power, $P_{CH}$, can be calculated using the following equation. Hereinafter, the MS output power can also be referred to as an uplink transmit power.

$$P_{CH} = \min(\Gamma_0 - \Gamma_{CH} - \alpha*(C+48), PMAX) \quad \text{[Equation 1]}$$

Referring to Equation 1, $\Gamma_{CH}$, $\Gamma_0$, $\alpha$, and PMAX are control information necessary to determining the MS output power. More specifically, $\Gamma_{CH}$ is the MS and channel specific parameter, sent to the MS in a radio link control (RLC) message. Moreover, $\Gamma_0$ equals 39 dBm for GSM400, GSM 700, GSM 850, and GSM900, and also equals 36 dBm for DCS1 800 and PCS 1900. Another control information, $\alpha$, is a system parameter, broadcast on PBCCH or optionally sent to MS in an RLC message. Furthermore, PMAX is the maximum allowed output in the cell. Lastly, the MS can determine the output power (or uplink transmit power), $P_{CH}$, by using the control information discussed above along with C value which is the normalized received signal level at the MS.

Conventionally, C value has been computed in packet idle mode and packet transfer mode. The C value can be calculated in packet idle mode or packet transfer mode (MAC-idle state or MAC-shared state) to obtain MS output power value or uplink power value in GPRS/EDGE systems. Further, although the C value can be considered as a variable value according to the received signal level in determining uplink power value in packet transfer mode, the C value can be measured in other mode(s) (e.g., packet idle mode, dual transfer mode, or dedicated mode) as well in order to reflect unpredictable radio channel environment more exactly since the MS can transit between modes.

During packet idle mode (or Medium Control Access (MAC)-idle state), a mobile station (MS) can periodically measure received signal level(s) of a packet common control channel (PCCCH). If PCCCH is not available or does not exist in the serving cell, the MS can measure the signal level(s) of common control channel (CCCH) instead.

A normalized C value of each radio block can be calculated using the following equation.

$$C_{block,n} = SS_{block,n} + Pb \quad \text{[Equation 2]}$$

In Equation 2, $SS_{block,n}$ denotes the mean of the received signal level of the four (4) normal bursts that compose the radio block. Moreover, Pb is a value of base transceiver station (BTS) output power reduction (relative to the output power used on broadcast control channel) used on the channel on which the measurements are performed. Lastly, $C_{block,n}$ value is filtered with a running average filter. Equation 3 is an example of a running average filter.

$$C_n = (1-a)*C_{n-1} + a*C_{block,n} \quad \text{[Equation 3]}$$

In Equation 3, a represents forgetting factor, and n denotes iteration index. Here, a=1 for n=1. Every time a new cell is selected, the value of n in the first sample is 1. In other words, the filter can be restarted with n=1 for the first sample every time a new cell is selected. Conventionally since the transition between the packet idle mode and packet transfer mode has been only considered, whenever the MS enters the packet idle mode or MAC-Idle state, the filter can continue from n and $C_n$ values obtained during the packet transfer mode or MAC-Shared state.

During packet transfer mode (or MAC-Shared state), a mobile station (MS) can use the same received signal level measurements as made for cell reselection on the BCCH carrier of the serving cell to get C value. In addition, the network can request MS to measure the received signal level of each radio block on one of the PDCH monitored by the MS for PACCH.

In the packet transfer mode (or MAC-shared state), the MS determines whether to measure either the BCCH or the PDCH according to PC_MEAS_CHAN parameter set by the network, and if PC_MEAS_CHAN=0, the received signal level of the BCCH of the serving cell can be measured. The PC_MEAS_CHAN parameter can be included in Global Power Control Parameters IE or GPRS Power Control Parameters IE. Further, PC_MEAS_CHAN can be transmitted via at least one message including Global Power Parameters IE and GPRS Power Control Parameters IE such as packet power control/timing advance message, PSI1 message, PSI13 message, and/or PSI14.

With respect to packet transfer mode (or MAC-shared state), if PC_MEAS_CHAN=0, the MS can measure the received signal level on the BCCH carrier of the serving cell.

Further in the packet transfer mode (or MAC-shared state), if PC_MEAS_CHAN=1, the MS can measure the received signal level of each radio block on one of the PDCH monitored by the MS for PACCH. In other words, if PC_MEAS_CHAN=1, the MS does not measure the BCCH and instead measures the PDCH to continue calculating n and $C_n$ values.

The C value refers to control information in the packet transfer mode or MAC-shared state. As such, the C value can be calculated when the MS is in packet transfer mode (or MAC-shared state). The MS in packet transfer mode or MAC-shared state can use the same received signal level measurements used for cell reselection on the BCCH carrier of the serving cell to calculate $C_n$ values. That is, the MS can measure the received signal level to prepare for diverse channel condition in a specified cell, and by using the measured received signal level, the MS can calculate $C_n$ values. Equation 4 illustrates this point in which the resulting measurements can then be filtered using the running average filter.

$$C_n = (1-b)*C_{n-1} + b*SS_n \qquad \text{[Equation 4]}$$

Referring to Equation 4, $SS_n$ is the received signal level of the measurement samples, b denotes forgetting factor, and n is the iteration index. Here, b=1 for n=1. If the MS enters packet transfer mode from packet idle mode or MAC-shared state from MAC-idle state, the filter can continue from n and $C_n$ values obtained during packet idle mode or MAC-idle state.

Alternatively, if indicated by the parameter PC_MEAS_CHAN, the MS can instead measure the received signal level of each radio block on one of the PDCH monitored by the MS for packet associated control channel (PACCH). If PDCH is measured, $C_n$ value can be calculated using $C_{block,n}$ derived according to Equation 2. Equation 5 illustrates running average filter used for calculating $C_n$ value.

$$C_n = (1-c)*C_{n-1} + c*C_{block,n} \qquad \text{[Equation 5]}$$

Referring to Equation 5, c is the forgetting factor, and n denotes iteration index. Here, c=1 for n=1. If the MS enters packet transfer mode from packet idle mode or MAC shared state from MAC-idle mode, the filter can continue from n and $C_n$ values obtained during packet idle mode or MAC-idle state.

Conventionally since the transition between the packet idle mode and packet transfer mode has been only considered, whenever the MS enters the packet transfer mode or MAC-Shared state, the filter can continue from n and $C_n$ values obtained during the packet idle mode or WAC-Idle state.

The C value is a GPRS/EDGE-related parameter used in packet transfer mode to obtain MS output power and then the C value is conventionally not calculated in the dedicated mode. As discussed above, the C value can be measured in dedicated mode in order to reflect unpredictable radio channel environment more accurately since the MS can dynamically transit between RR modes. If such transition is not considered, whenever the MS enters packet idle mode or packet transfer mode, the MS may calculate the MS output power with the C value obtained from the previous packet idle mode or packet transfer mode regardless of how much time has passed since leaving such a RR mode.

The MS in the dedicated mode can calculate the C value or cannot calculate the C value. If the C value is calculated, the C value can be calculated according to following two ways. First, the MS can use the same received signal level measurements used for cell reselection on the BCCH carrier of the serving cell to calculate the C values. A detailed discussion with respect to calculating the C value is made with respect to discussion related to Equation 4.

In the conventional GSM system, the network determines the uplink MS output power and instructs the MS to transmit the circuit-switched data using the MS output power provided by the network through the message. The dedicated mode is a CS-based mode, and the MS output power is determined by the network considering the result of measurement reported by the MS. That is, the network determines the MS output power for the MS via a layer 1 (L1) header on slow associated control channel (SACCH). The MS receives the MS output power in a 5-bit information known to as ordered MS output power included in the SACCH L1 header. Subsequently, the MS uses the received 5-bit information to determine appropriate MS output power.

Second, the MS can calculate the C value using the $P_{CH}$ value. Here, a detailed discussion regarding determining the C value and $P_{CH}$ value is provided with respect to discussion related to Equation 1 and Equations 6-8 provided below.

In Equation 1, the value of $P_{CH}$ can be the MS output power ordered by the network for uplink transmit power in the dedicated mode and using this value, the C value can be determined. For example, the $C_1$ value can be determined using the same value as the C value and the $C_1$ value can be used to determine the $C_2$ value and subsequent values thereof when the MS enter the packet idle mode (or MAC-idle state) from the dedicated mode. In other words, the $C_1$ value is determined in the dedicated mode, and the $C_2$ value and subsequent values thereof can be determined in the packet idle mode (or MAC-idle state).

If $\Gamma_0 - \Gamma_{CH} - \alpha*(C+48) < \text{PMAX}$, the C value can be expressed as follows.

$$C = (\Gamma_0 - \Gamma_{CH} - P_{CH})/\alpha - 48 \qquad \text{[Equation 6]}$$

Here, if the MS enters the packet idle mode (or MAC-idle state) from the dedicated mode, the C value can be calculated using Equation 6. The resulting C value can then be assigned or substituted as the $C_1$ value. Subsequently, if the MS enters the packet idle mode (or MAC-idle state), n=2 and the $C_1$ value can be used to calculate the $C_2$ value.

If $\Gamma_0 - \Gamma_{CH} - \alpha*(C+48) \geq \text{PMAX}$, the C value can be expressed as follows.

$$P_{CH} = \text{PMAX} = \Gamma_0 - \Gamma_{CH} - \alpha(C+48)$$

$$C = (\Gamma_0 - \Gamma_{CH} - \text{PMAX})/\alpha - 48 \qquad \text{[Equation 7]}$$

Here, if the MS enters the packet idle mode (or MAC-idle state) from the dedicated mode, the C value can be calculated using Equation 7. The resulting C value can then be assigned or substituted as the $C_1$ value. Subsequently, if the MS enters the packet idle mode (or MAC-idle state), n=2 and the $C_1$ value can be used to calculate the $C_2$ value.

As discussed, the value of $P_{CH}$ can be the MS output power ordered by the network for the uplink transmit power in the dedicated mode, and is determined by the network. That is, because the value of $P_{CH}$ is determined by the network and not by the MS, the value of $P_{CH}$ generally does not exceed PMAX of Equation 1. Consequently, Equation 1 can be modified as shown in Equation 8.

$$P_{CH} = \Gamma_0 - \Gamma_{CH} - \alpha*(C+48) \qquad \text{[Equation 8]}$$

Here, the C value can be determined according to Equation 1 regardless of $\Gamma_0-\Gamma_{CH}-\alpha*(C+48)<PMAX$. Further, in Equation 1, the C value is used in calculation of the value of $P_{CH}$. However, the C value can be used to determine the MS output power (or uplink transmit power) using the ordered MS output power which is provided by the network.

As discussed, Equation 1 can be modified if necessary. Even if Equation 1 is modified, the modified equation can be used to determine the C value according to the MS output power from the network.

Figure 2:
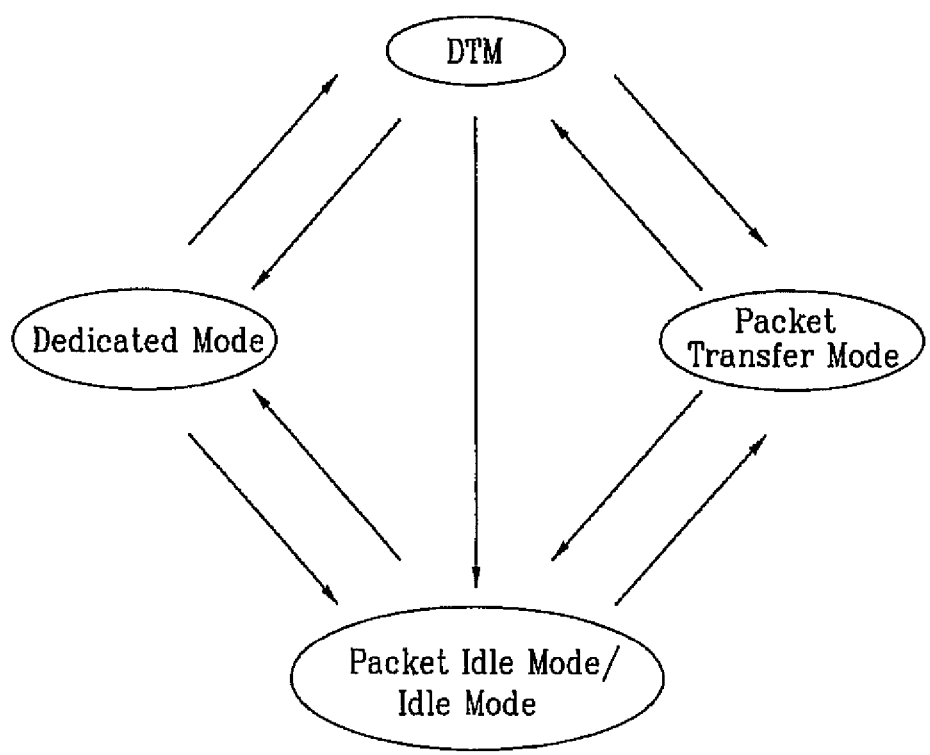
FIG. 2 is an exemplary diagram illustrating relationship of different radio resource (RR) modes.

FIG. 2 is an exemplary diagram illustrating relationship of different radio resource (RR) modes. The RR mode can be referred to as RR operation mode as well. As illustrated in FIG. 2, the RR modes include DTM, dedicated mode, idle/packet idle mode, and packet transfer mode. Hereinafter, the packet idle mode can also be referred to as MAC-idle state, and the packet transfer mode can be referred to as MAC-shared state.

There can be transitions between RR operating modes by the MS. The transitions between the RR modes can be different for each mode of operation. Although in certain situations, the DTM is not supported, the discussion hereinafter will be based on the DTM being supported. As such, if the DTM is supported by the MS and the network, the MS can make transitions to/from the DTM. The DTM can be entered via a packet request procedure from dedicated mode or RR connection establishment procedure from the packet transfer mode assuming that the MS and the network support the feature of DTM enhancements, for example.

Referring to FIG. 2, the MS can make transitions from one RR mode to another RR mode. The discussion below relates to calculating the C value by the MS in different RR modes. As discussed, FIG. 2 illustrates four RR modes which are packet idle mode/idle mode (or MAC-idle state), dedicated mode, DTM, and packet transfer mode (MAC-shared state). The transition between RR modes by the MS will be discussed from the perspective of each RR mode. More specifically, the discussion will be from the perspective of the RR mode to which the MS has entered or moved to.

The first perspective describes the MS in packet idle mode (or MAC-idle state). The second perspective describes the MS in the dedicated mode. The third perspective describes the MS in the DTM. The fourth perspective describes the MS in the packet transfer mode (or MAC-shared state).

With respect to the first perspective, the MS can enter the packet idle mode (or MAC-idle state) from three (3) different modes. First, the MS can enter the packet idle mode (or MAC-idle state) from the packet transfer mode (or MAC-shared state). Here, the MS can continue to calculate the C value using the n and $C_n$ values obtained during the packet transfer mode (or MAC-shared state).

Second, the MS can enter the packet idle mode (or MAC-idle state) from the DTM. Here, the MS can continue to calculate the C value using the n and $C_n$ values obtained during the DTM.

Lastly, the MS can make transition from the dedicated mode to the packet idle mode (or MAC-idle state). Here, if the MS has calculated the C value during the dedicated mode, the MS in packet idle mode (or MAC-idle state) can calculate the C value using the n and $C_n$ values obtained during the dedicated mode. However, if the MS did not calculate the C value (e.g., no valid C value) during the dedicated mode, then filtering can be restarted with n=1 and the C value can be calculated using Equation 2 and Equation 3 in the packet idle mode.

In the second perspective, the MS can enter the dedicated mode from the DTM or the packet idle mode (or MAC-idle state). First, the MS can enter the dedicated mode from the DTM. Here, if the MS has calculated the C value in the DTM, the MS can continue to calculate the C value using the n and $C_n$ values obtained during the DTM through Equation 4. If the MS is absent of the function of calculating the C value in the dedicated mode, the C value is not be calculated in the dedicated mode transited from the DTM.

Second, the MS can enter the dedicated mode from the packet idle mode (or MAC-idle state). Here, if the MS has calculated the C value during the packet idle mode (or MAC-idle state), the MS can continue to calculate the C value using the n and $C_n$ values obtained during the packet idle mode (or MAC-idle state) through Equation 4. If the MS is absent of the function of calculating the C value in the dedicated mode, the C value is not be calculated in the dedicated mode transited from the packet idle mode (or MAC-idle state).

With respect to third perspective, the MS can enter the packet transfer mode (or MAC-shared state) from the DTM or the packet idle mode (or MAC-idle state). First, the MS can enter the packet transfer mode (MAC-shared state) from the DTM. Here, if the network and the MS can support enhanced DTM CS release procedure, this transition is possible. Assuming that the transition can be made, the MS can calculate the C value using the n and $C_n$ values obtained during the DTM.

Second, the MS can enter the packet transfer mode (MAC-shared state) from the packet idle mode (MAC-idle state). Here, the MS can continue to calculate the C value using the n and $C_n$ values obtained during the packet idle mode (or MAC-idle state).

With respect to fourth perspective, the MS can enter the DTM from the dedicated mode or the packet transfer mode (or MAC-shared state). First, the MS can enter the DTM from the dedicated mode. Here, if the MS has calculated the C value during the dedicated mode through Equation 4, the MS in DTM can continue to calculate the C value using the n and $C_n$ values obtained during the dedicated mode. However, if the MS did not calculate the C value during the dedicated mode (i.e. no valid C value during the dedicated mode), then filtering can be restarted and the C value can be calculated starting with n=1.

Second, the MS can enter the DTM from the packet transfer mode (or MAC-shared state). Here, if the network and the MS can support enhanced DTM CS establishment procedure, this transition is possible. Assuming that the transition can be made, the MS can calculate the C value using the n and $C_n$ values obtained during the packet transfer mode (or MAC-shared state).

Here, "DTM Enhancements" can be referred as both enhanced DTM CS release procedure and enhanced DTM CS establishment procedure.

Further, "DTM Enhancements" is available to provide transition between the packet transfer mode (MAC-shared state) and the DTM. Such a transition does not affect the GPRS and the PS connection can be maintained without any interruption regardless of whether CS connection is released or established or not.

As discussed, in case C value can be calculated in the dedicated mode, the C value in each RR mode can continue to be filtered using the C value obtained from the previous RR mode right after the MS transit from one RR mode to another RR mode. And then, the MS can transmit the uplink packet data using the more accurate MS output power.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of calculating a normalized received signal level (NRSL) value in a mobile communication system that supports at least a packet idle mode, a packet transfer mode, a dedicated mode or a dual transfer mode, the method comprising:

obtaining, by a mobile station (MS), a first NRSL value in the dedicated mode;

transitioning, by the MS, from the dedicated mode to the packet idle mode;

calculating, by the MS in the packet idle mode, a second NRSL value for use in the packet idle mode, the second NRSL value calculated using a mean value of a received signal level of four normal bursts that compose a radio block and an output power reduction value of a base transceiver station (BTS) relative to an output power used for a broadcast control channel; and filtering, by the MS in the packet idle mode, the second NRSL value with a running average filter using a forgetting factor, a first iteration index, and the first NRSL value, wherein the first iteration index continues from a second iteration index that is obtained by the MS in the dedicated mode, and wherein the dedicated mode is a circuit switched mode and the packet transfer mode is a packet switched mode.

2. The method of claim 1, wherein the running average filter is expressed as $C_n = (1-a)*C_{n-1} + a*C_{block,n}$, where "a" is the forgetting factor, "n" is the first iteration index, and $C_{block,n}$ is the second NRSL value for each radio block.

3. The method of claim 2, wherein the second NRSL value is calculated by $C_{block,n} = SS_{block,n} + Pb$, where $SS_{block,n}$ is the mean value and Pb is the output power reduction value.

4. A method of calculating a normalized received signal level (NRSL) value in a mobile communication system that supports at least a packet idle mode, a packet transfer mode, a dedicated mode or a dual transfer mode, the method comprising:

receiving, by a mobile station (MS), four normal bursts that compose a radio block;

transitioning, by the MS, from the dedicated mode to the packet idle mode;

calculating, by the MS in the packet idle mode, the NSRL value for use in the packet idle mode, the NRSL value calculated using a mean value of a received signal level of the four normal bursts and a output power reduction value of a base transceiver station (BTS) relative to an output power used for a broadcast control channel;

filtering, by the MS, the NRSL value with a running average filter using a forgetting factor and an iteration index; and transmitting, by the MS, data using an output power calculated in consideration of the filtered NRSL value, wherein the running average filter is restarted with the iteration index set to 1 for a first sample when the MS has no valid NRSL value in the dedicated mode, and wherein the dedicated mode is a circuit switched mode and the packet transfer mode is a packet switched mode.

5. The method of claim 4, wherein the NRSL value is filtered by $C_n = (1-a)*C_{n-1} + a*C_{block,n}$, where "a" is the forgetting factor, "n" is the iteration index, and $C_{block,n}$ is the NRSL value for each radio block.

6. The method of claim 4, wherein the NRSL value is calculated by $C_{block,n} = SS_{block,n} + Pb$, where $SS_{block,n}$ is the mean value and Pb is the output power reduction value.

7. A mobile station (MS) for calculating a normalized received signal level (NRSL) value in mobile communication system that supports at least a packet idle mode, a packet transfer mode, a dedicated mode or a dual transfer mode, the MS comprising:

a running average filter; and a processor configured to:

obtain a first NRSL value in the dedicated mode;

transition from the dedicated mode to the packet idle mode; and calculate a second NRSL value in the packet idle mode for use in the packet idle mode, the second NRSL value calculated using a mean value of a received signal level of four normal bursts that compose a radio block and an output power reduction value of a base transceiver station (BTS) relative to an output power used for a broadcast control channel, wherein the running average filter is configured to filter the second NRSL value in the packet idle mode using a forgetting factor, a first iteration index, and the first NRSL value, and wherein the first iteration index continues from a second iteration index that is obtained by the MS in the dedicated mode, and wherein the dedicated mode is a circuit switched mode and the packet transfer mode is a packet switched mode.

8. The mobile station of claim 7, wherein the running average filter is expressed as $C_n = (1-a)*C_{n-1} + a*C_{block,n}$, where "a" is the forgetting factor, "n" is the first iteration index, and $C_{block,n}$ is the second NRSL value for each radio block.

9. The mobile station of claim 7, wherein the second NRSL value is calculated by $C_{block,n} = SS_{block,n} + Pb$, where $SS_{block,n}$ is the mean value and Pb is the output power reduction value.

10. A mobile station (MS) for calculating a normalized received signal level (NRSL) value in mobile communication system that supports at least a packet idle mode, a packet transfer mode, a dedicated mode or a dual transfer mode, the MS comprising:

a transmitter configured to transmit data;

a running average filter;

a receiver configured to receive four normal bursts that compose a radio block; and a processors configured to transition the MS from the dedicated mode to a packet idle mode and calculate the NRSL value for use in the packet idle mode, the NRSL value calculated using a mean value of a received signal level of the four normal bursts and an output power reduction value of a base transceiver station (BTS) relative to an output power used for a broadcast control channel (BCCH), wherein the running average filter is configured to filter the NRSL value using a forgetting factor and an iteration index, wherein the running average filter is restarted with the iteration index set to 1 for a first sample when the MS has no valid NRSL value during the dedicated mode, wherein the transmitter is further configured to transmit the data using an output power calculated in consideration of the filtered NRSL value, and wherein the dedicated mode is a circuit switched mode and the packet transfer mode is a packet switched mode.

11. The mobile station of claim 10, wherein the running average filter is expressed as $C_n = (1-a)*C_{n-1} + a*C_{block,n}$, where "a" is the forgetting factor, "n" is the iteration index, and $C_{block,n}$ is the NRSL value for each radio block.

12. The mobile station of claim 10, wherein the NRSL value is calculated by $C_{block,n}=SS_{block,n}+Pb$, where $SS_{block,n}$ is the mean value and Pb is the output power reduction value.

* * * * *